US006984335B2

(12) United States Patent
Shu et al.

(10) Patent No.: US 6,984,335 B2
(45) Date of Patent: Jan. 10, 2006

(54) REDUNDANTLY CONSTRAINED LAMINAR STRUCTURE AS WEAK-LINK MECHANISMS

(75) Inventors: Deming Shu, Darien, IL (US); Thomas S. Toellner, Chicago, IL (US); E. Ercan Alp, Naperville, IL (US)

(73) Assignee: The University of Chicago, Chicago, IL (US)

( * ) Notice: Subject to any disclaimer, the term of this patent is extended or adjusted under 35 U.S.C. 154(b) by 169 days.

(21) Appl. No.: 10/619,111

(22) Filed: Jul. 14, 2003

(65) Prior Publication Data

US 2004/0013898 A1    Jan. 22, 2004

Related U.S. Application Data

(62) Division of application No. 09/930,699, filed on Aug. 15, 2001, now Pat. No. 6,607,840.

(60) Provisional application No. 60/239,599, filed on Oct. 11, 2000.

(51) Int. Cl.
     *C03C 15/00*     (2006.01)
(52) U.S. Cl. ............................ 216/41; 216/42; 216/43; 216/48; 216/75
(58) Field of Classification Search .................. 216/41, 216/42, 43, 48, 75
     See application file for complete search history.

(56) References Cited

U.S. PATENT DOCUMENTS 5,185,527 A    2/1993  Bluzer
5,339,457 A    8/1994  Kawasaki et al.
5,387,795 A    2/1995  Kuzay et al.
5,432,149 A    7/1995  Schuller et al.
5,442,195 A    8/1995  Saitoh et al.
5,896,200 A    4/1999  Shu
6,037,596 A    3/2000  Shu et al.
6,239,431 B1   5/2001  Hilton et al.
6,313,478 B1 * 11/2001 Lee et al. .................... 257/8
6,348,699 B1   2/2002  Zehe

* cited by examiner

*Primary Examiner*—Nadine G. Norton
*Assistant Examiner*—Binh X. Tran
(74) *Attorney, Agent, or Firm*—Joan Pennington

(57) ABSTRACT

Redundantly constrained laminar structures as weak-link mechanisms and a novel method for manufacturing the redundantly constrained laminar structures as weak-link mechanisms are provided. The method for producing the redundantly constrained laminar structures as weak-link mechanisms is carried out by lithographic techniques. A designed pattern is repeatedly chemically etched with a mask to produce a plurality of individual identical units. The units are stacked together to form the laminar structure and are secured together with fasteners. A high quality adhesive can be applied to the sides of the laminar structure to provide the mechanism equivalent to a single piece mechanism. The redundantly constrained laminar structures as weak-link mechanisms of the invention include a stack of a plurality of thin material structures. The stack of structures forming a laminar structure include multiple weak-link connections providing controllable movements in a plane of the layer and having a desired stiffness and stability. The plurality of thin material structures include predetermined locating-holes used with locating-pins to precisely stack the thin material structures together and are used with fasteners to secure the stack together.

6 Claims, 4 Drawing Sheets

REDUNDANTLY CONSTRAINED LAMINAR STRUCTURE AS WEAK-LINK MECHANISMS

This application is a divisional application of Ser. No. 09/930,699 filed on Aug. 15, 2001, now, U.S. Pat. No. 6,607,840.

This application claims the benefit of prior filed copending provisional application filed Oct. 11, 2000, by Deming Shu, Thomas S. Toellner, and Esen E. Alp, provisional application Ser. No. 60/239,599 and entitled REDUNDANTLY CONSTRAINED LAMINAR STRUCTURE AS WEAK-LINK MECHANISMS. The subject matter of the above-identified copending provisional application is incorporated herein by reference.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to a novel weak-link mechanism with redundant constrained structure, and more particularly, relates to redundantly constrained laminar structures as weak-link mechanisms and a novel method for manufacturing the redundantly constrained laminar structures as weak-link mechanisms.

DESCRIPTION OF THE RELATED ART

Known weak-link mechanisms typically are single layer structures with usually only two connections. Fabrication techniques for the structures involve precision machining of individual blocks of metal or other material. This is expensive and difficult to achieve the desired precision. These single layer structures do not normally have the desired stiffness against flexing. In addition, the limitation of two connecting links is a factor in the instability of the structure during the small movements.

It is desirable to provide weak-link mechanisms that allow very small, controllable movements in certain directions while exhibiting a high level of stiffness to resist distortion in another direction. Unlike the traditional kinematics linear spring mechanisms, redundant constrained weak-link mechanisms should provide much higher structure stiffness and stability. A need exists for weak-link mechanisms in various instruments involving small, controllable movements to provide high sensitivity while maintaining stability in the positioning of a device or devices, such as optical devices or other devices.

A principal object of the present invention is to provide a novel weak-link mechanism with redundant constrained structure.

Another of the present invention is to provide redundantly constrained laminar structures as weak-link mechanisms.

Another of the present invention is to provide redundantly constrained laminar structures as weak-link mechanisms allowing very small, controllable movements in certain directions while exhibiting a high level of stiffness to resist distortion in another direction.

Another of the present invention is to provide a novel method for manufacturing the redundantly constrained laminar structures as weak-link mechanisms.

Another of the present invention is to provide a novel method for manufacturing the redundantly constrained laminar structures as weak-link mechanisms by a relatively inexpensive and precise technique of producing multiple, substantially identical, thin layers of a design with the controllable movement being in the plane of the layer and stacking the substantially identical, thin layers to form a structure having the desired stiffness and stability.

Other important objects of the present invention are to provide such manufacturing method and redundantly constrained laminar structures as weak-link mechanisms substantially without negative effect and that overcome some disadvantages of prior art arrangements.

SUMMARY OF THE INVENTION

In brief, redundantly constrained laminar structures as weak-link mechanisms and a novel method for manufacturing the redundantly constrained laminar structures as weak-link mechanisms are provided. The method for producing the redundantly constrained laminar structures as weak-link mechanisms is carried out by lithographic techniques. A designed pattern is repeatedly chemically etched with a mask to produce a plurality of individual substantially identical units. The units are stacked together to form the laminar structure and are secured together. A high quality adhesive can be applied to the sides of the laminar structure to provide the mechanism equivalent to a single piece mechanism.

The redundantly constrained laminar structures as weak-link mechanisms of the invention include a stack of a plurality of thin material structures. The stack of structures forming a laminar structure include multiple weak-link connections providing controllable movements in a plane of the layer and having a desired stiffness and stability.

In accordance with features of the invention, the plurality of thin material structures include predetermined locating-holes used with locating-pins to precisely stack the thin material structures together and are used with fasteners to secure the stack together.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
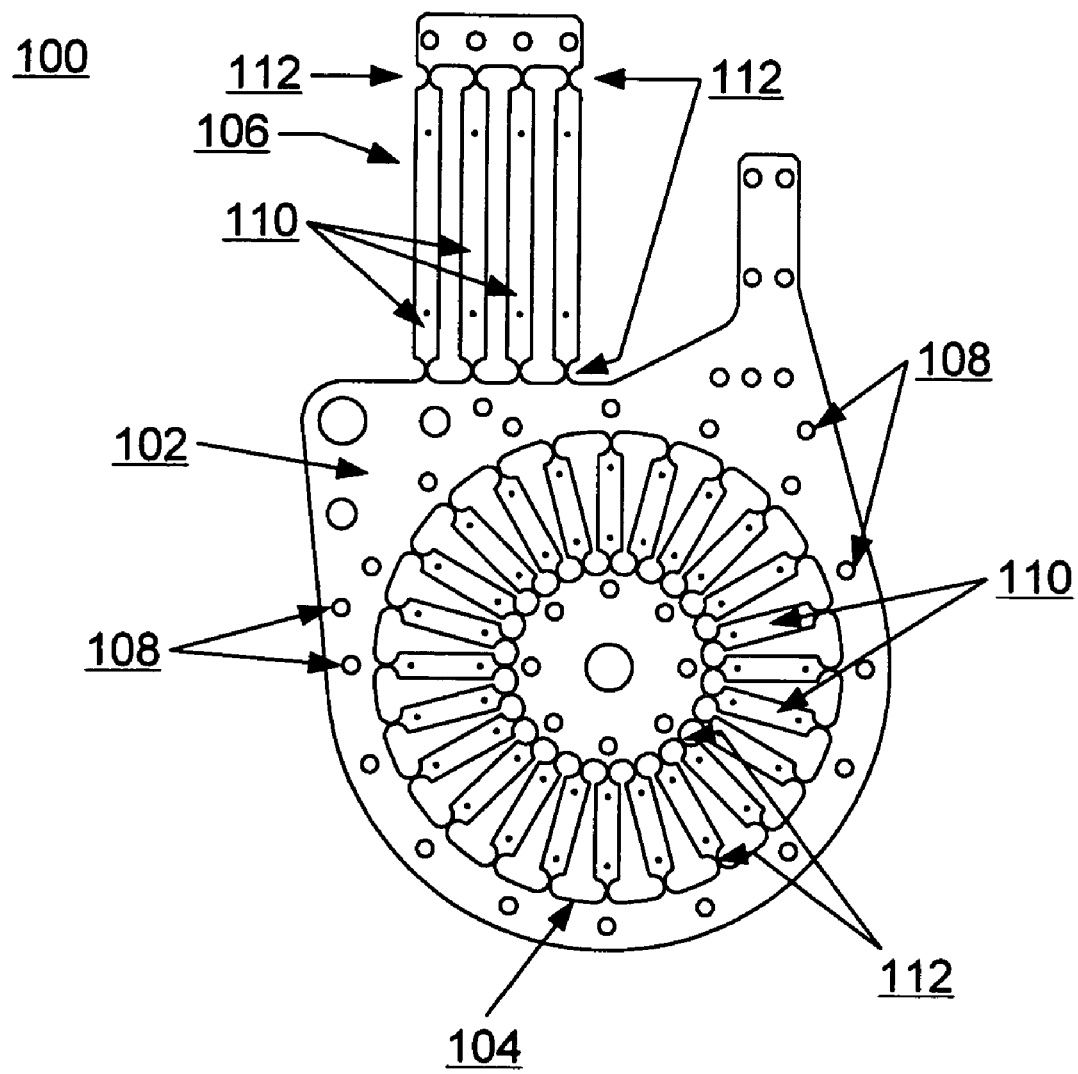
FIG. 1 illustrates an exemplary redundantly constrained weak-link structure in accordance with the preferred embodiment.

Having reference now to the drawings, in FIG. 1 there is shown an exemplary redundantly constrained weak-link structure in accordance with the preferred embodiment generally designated by the reference character 100. FIG. 1 shows the shape of the metal weak-link sheet 102, which is produced by a photochemical machining process. Two motion structures 104, 106 are designed on the same metal sheet 102. A wheel-shaped weak-link group 104 acts as a planar rotary shaft, and a parallelogram-shaped weak-link group 106 acts as a linear slide. To optimize the system stiffness, over-constrained mechanisms were chosen in this design of weak-link structure 100. The precision of the modern photochemical machining process using lithography techniques makes it possible to construct a strain-free, or strain-limited, over-constrained mechanism on the thin metal sheet 102. By stacking these thin metal weak-link sheets 102 with align-pins, a solid complex weak-link structure is constructed for a reasonable cost. Weak-link sheet 102 includes predefined locating-holes, such as holes 108, used with locating pins to precisely stack the thin structures together to form the laminar weak-link structure 100. Fasteners, such as bolts, are received in predefined locating-holes 108 to secure the weak-link sheets 102 together. Each weak-link group 104, 106 includes more than two connecting links 110, each having at least one or a pair of weak-link connections 112, and preferably at least four connecting links 110. Often a larger number of connecting links 110 is required for the controlled movement with stability, for example, as shown in weak-link group 104. The multiple weak-link connections 112 provide controllable movements in a plane of the stack and the laminar structure 100 has a set stiffness and stability.

In our first prototype, 250-$\mu$m-thick stainless steel sheets 102 were used. Each group consists of twenty weak-link sheets 102. A 0.6-degree adjustment range was reached, which agreed with the finite element analysis result.

A finite element simulation for the wheel-shaped weak-link displacement was provided under a 0.89-Nm torsion load. In this case, the maximum displacement on the weak-link is 94 $\mu$m, which corresponds to a 0.25-degree angular motion on the planar shaft, and the maximum stress in the weak region is 175 MPa, which is 72% of the yield stress as defined by von Mises criteria.

Figure 2:
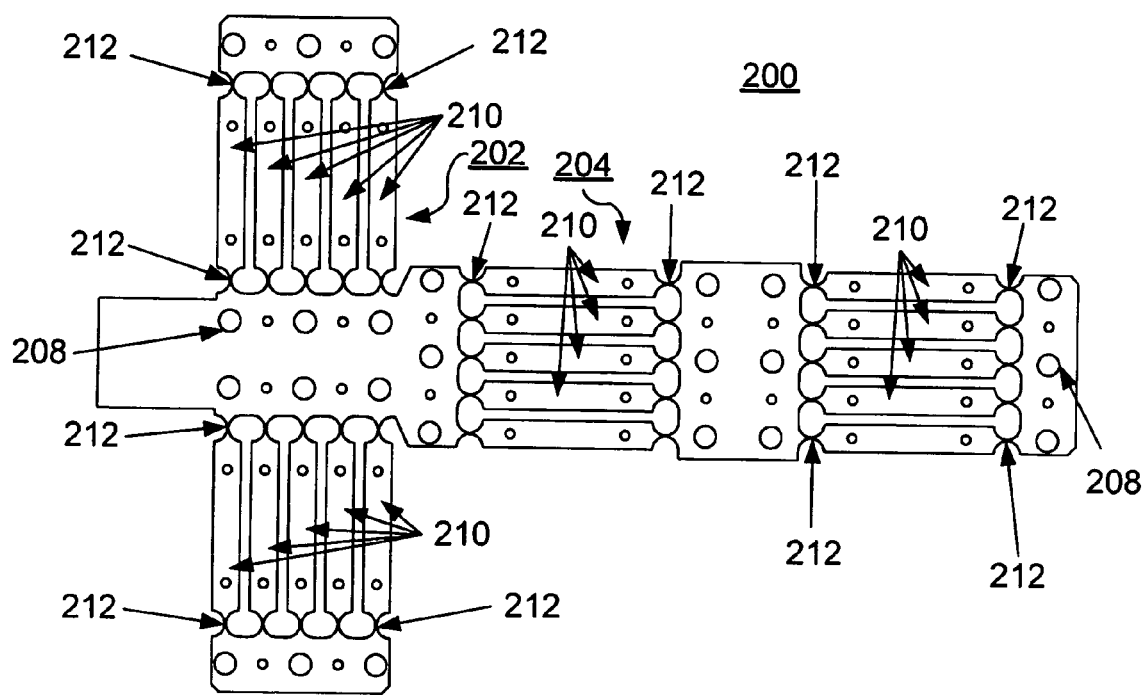
FIG. 2 illustrates another exemplary redundantly constrained weak-link structure in accordance with the preferred embodiment.

In FIG. 2, there is shown another exemplary redundantly constrained weak-link structure in accordance with the preferred embodiment generally designated by the reference character 200. Redundantly constrained weak-link structure 200 is a doubly redundant constrained parallelogram. Redundantly constrained weak-link structure 200 include a pair of perpendicularly arranged parallelogram-shaped weak-link groups 202 and 204. Redundantly constrained weak-link structure 200 is formed of multiple, thin material structures stacked together to form the laminar redundantly constrained weak-link structure 200. Predefined locating-holes in each of the multiple, thin material structures, such as holes 208, are used with locating pins to precisely stack the thin structures together to form the laminar weak-link structure 200. Parallelogram-shaped weak-link groups 202 and 204 include a plurality of connecting links 210, each having at least one or a pair of weak-link connections 212. As shown in FIG. 2, each weak-link group 204, 206 includes more than four connecting links 210. The multiple weak-link connections 212 provide controllable movements in a plane of the stack and the laminar structure 200 has a set stiffness and stability.

In accordance with features of the invention, a novel miniature multi-axis driving structure 300 is provided that allows positioning of two crystals with better than 50-nrad angular resolution and nanometer linear driving sensitivity. The precision and stability of this structure 300 allow the user to align or adjust an assembly of crystals to achieve the same performance as does a single channel-cut crystal, so we call it an artificial channel-cut crystal. With the availability of third-generation of hard x-ray synchrotron radiation sources, such as the Advanced Photon Source (APS) at Argonne National Laboratory (ANL), x-ray inelastic scattering and x-ray nuclear resonant scattering provide powerful ways for investigating the vibration dynamics of a variety of materials and condensed matter systems.

The APS SRI-CAT 3-ID beamline is dedicated to high-energy-resolution x-ray scattering studies in the energy range of 6–30 keV. A special 2.7-cm-period undulator, optimized for peak brilliance is installed. The beamline's basic components include filters, white-beam slits, integral shutters, and a Kohzu double-crystal monochromator with water-cooled diamond crystals as a pre-monochromator. The beamline special components, such as custom-built high-resolution monochromators and a dual-function (collimating or focusing) x-ray mirror system, provide high flexibility for the optical system, so that users can optimize the beamline configuration for various applications. In particular, a 4-bounce high-resolution monochromator using a nested channel-cut crystal approach is used to deliver an x-ray beam with meV bandpass for x-ray inelastic scattering experiments.

There are design restrictions to the nested channel-cut geometry. Because these two channel-cut crystals are nested within each other, the size of the channel-cut crystals becomes an important design factor. The lack of availability of large crystals with good long-range crystallinity restricts the size of the outer channel-cut crystal. On the other hand, the input beam power absorbed by the first optical surface on the outer channel-cut crystal can reach a fraction of a Joule and can cause crystal local temperature and strain variations. In certain high-energy-resolution applications, these effects become major restrictions to the optical design. To overcome these obstacles, we have developed a novel miniature multi-axis driving structure 300 of FIGS. 3 and 4. The precision and stability of this structure 300 allow us to align or adjust an assembly of crystals to achieve the same performance as does a single channel-cut crystal, called an artificial channel-cut crystal. Using this structure 300, we can make an outer channel-cut crystal large enough to optimize the nested monochromator's performance and compensate the crystal local temperature and strain variations.

The artificial channel-cut crystal was designed for a novel nested high-energy-resolution monochromator, which is optimized for an $^{151}$Eu nuclear resonance experiment at the energy of 21.542 keV. The high-energy-resolution monochromator uses a symmetric silicon (15 11 3) channel-cut crystal nested within an asymmetrically cut silicon (4 4 0) artificial channel-cut crystal. This optical design can produce a 1-meV resolution beam with a high throughput. However, if we use a natural channel-cut crystal to make the outer channel-cut crystal, the diffraction faces can be separated by 200 mm, which makes it difficult to avoid problems associated with strain and temperature variations. We use two asymmetrically cut silicon (4 4 0) crystals, which are each sized 25 mm×25 mm×60 mm, to act as an artificial outer channel-cut crystal. The major specification for the artificial channel-cut crystal structure is the angular alignment capability between the two crystals. Due to the 300-nrad Darwin width of the silicon (4 4 0) in this asymmetrically cut geometry, a 50-nrad pitch alignment resolution is needed. Long-term positioning stability is also very important to the artificial channel-cut crystal. In a temperature-controlled environment (+/–0.2° C.), an angular drift rate less than 25-nrad per hour is required. Table 1 lists the design specifications for this (4 4 0) artificial channel-cut crystal.

TABLE 1

Design specifications for a (4 4 0) artificial channel-cut crystal

| | |
|---|---|
| Maximum Overall Dimension | 216 mm × 212 mm × 92 mm |
| Main Shaft Diameter | 10 mm |
| Maximum Thickness in Nested Area | 30 mm |
| Single Crystal Size | 25 mm × 25 mm × 60 mm |
| Number of Angular Alignment Axes | 2 |
| Angular Alignment Resolution (Pitch) | 50 nrad |
| Angular Alignment Resolution (Roll) | 600 nrad |
| Angular Alignment Stability (Pitch) | Drift less than 25 nrad per hour |
| Angular Alignment Stability (Roll) | Drift less than 100 nrad per hour |
| Angular Alignment Range (Pitch) | 0.6 degree |
| Angular Alignment Range (Roll) | 2 degree |

Figure 3:
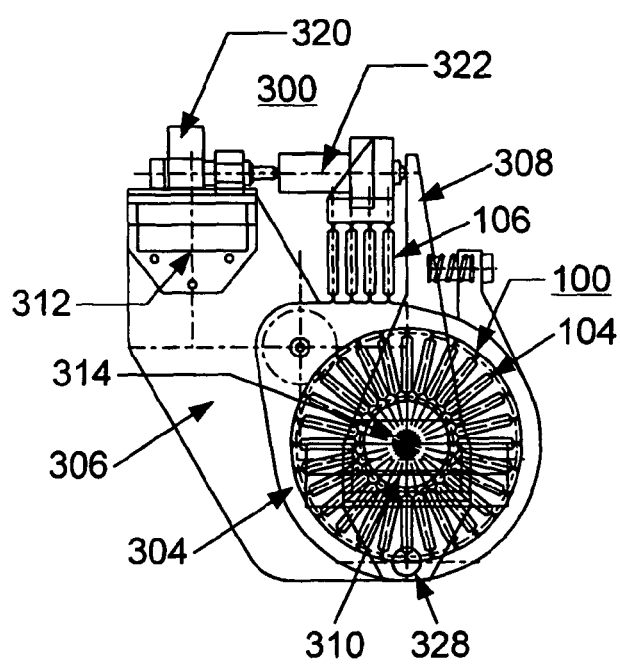
FIGS. 3 and 4 illustrate an exemplary miniature multi-axis driving structure with a high-stiffness weak-link structure in accordance with the preferred embodiment.
Figure 4:
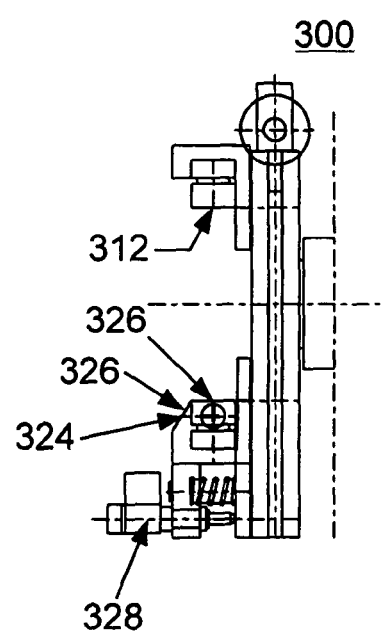

FIGS. 3 and 4 illustrate an exemplary miniature multi-axis driving structure with a high-stiffness weak-link structure in accordance with the preferred embodiment generally designated by the reference character 300. Designing such a miniature multi-axis driving structure 300 with high stiffness and nanometer sensitivity is achieved in accordance with the preferred embodiment. Novelty of this new structure includes combining a closed-loop controlled piezoelectric transducer (PZT) technology with a novel high-stiffness weak-link structure generally designated by the reference character 304. High-stiffness weak-link structure 304 is substantially identical to the high-stiffness weak-link structure 100 illustrated and described with respect to FIG. 1.

Using stacked thin metal sheets configured and manufactured by chemical etching and lithography techniques, we were able to design a planar-shaped, high-stiffness, high-stability weak-link structure 304 for artificial channel-cut crystal use. To optimize the system stiffness, we have chosen over-constrained mechanisms in this design. The precision of modern photochemical machining processes using lithography techniques makes it possible to construct a strain-free, or strain-limited, over-constrained mechanism on thin metal sheets 102. By stacking these thin-metal weak-link sheets with alignment-pins, we can construct a solid complex weak-link structure for a reasonable cost. The test result shows that this novel weak-link mechanism demonstrates a smooth 1:15 motion reduction ratio with high stiffness and stability. Driven by a closed-loop-controlled piezoelectric transducer with 1-nm positioning resolution, this mechanism 304 is capable of providing motion adjustments at the angstrom level.

FIGS. 3 and 4 illustrate an exemplary design of the miniature multi-axis driving structure 300 for an artificial channel-cut crystal. The structure 300 consists of three sub-assemblies: one base structure 306 and two crystal holders. The base structure 306 includes a compact sine-bar driving mechanism 308 for the crystal pitch alignment, which is a key component of the whole structure. There are two groups 104,106 of stacked thin metal weak-link structures 304 mounted on each side of a base plate 306. A sine-bar 308 is installed on the center of a planar rotary shaft 310 for the pitch alignment between the two silicon (4 4 0) single crystals 312, 314. Two linear drivers 320 322 are mounted on the base plate serially to drive the sine-bar 308. The rough adjustment is performed by a motorized micro-actuator for pitch adjustment 320, such as a Picomotor®, with a 20-nm to 30-nm step size. A closed-loop controlled piezoelectric transducer (PZT) 322, such as a Queensgate® closed-loop controlled PZT 322 with capacitance sensor provides 1-nm resolution for the pitch fine alignment. A pair of commercial flexure bearings or springs 324 is mounted on one of the crystal holders 326, and a Picomotor driven structure 328 provides the roll alignment for the crystal 314.

We have tested the sensitivity of the weak-link sine-bar structure with a laser Doppler angular encoder. A 200-mm-long aluminum arm is mounted on the center of the planar rotary shaft, perpendicular to the sine-bar 308. A set of prisms is mounted at the end of the arm as a multi-reflection displacement sensor. During this test, a series of 5-nm incremental steps is applied to the sine-bar by the Queensgate PZT 322. A series of angular steps was recorded from the laser encoder. The average step size is 33 nrad with a 7 nrad RMS deviation.

We have tested the first prototype artificial channel-cut crystal as an outer crystal for a 4-bounce high-resolution monochromator with nested configuration at the Advanced Photon Source APS 3-ID-B experiment station at Argonne National Laboratory. As a typical case, a two-hour stability result with a 1-meV bandwidth monochromatic beam shows the change in transmitted intensity reflects the change in beam position, thermal changes, and crystal angle variations combined. At this point we have not isolated the contribution of the artificial channel-cut crystal assembly alone. However, we infer that, the contribution of the angular drift of two crystals attached to each other with the mechanism described here is very much less than 25 nrad per hour.

In brief summary, the solution provided here to bring two separate single crystals into a stable alignment at the level of interatomic distances enables new types of x-ray optics design that goes beyond the particular application mentioned earlier. Our motivation to solve a practical problem with respect to construction of a tunable high resolution monochromator with an energy bandpass of 1 meV above 20 keV has led to the high stiffness weak link mechanism design which is equally applicable to x-ray interferometers, and x-ray wave guides. Therefore, the immediate successful application to an artificial channel cut crystal assembly for inelastic x-ray scattering studies may be followed by other innovative applications.

With the availability of third-generation hard x-ray synchrotron radiation sources, such as the Advanced Photon Source (APS) at Argonne National Laboratory, x-ray inelastic scattering and x-ray nuclear resonant scattering provide powerful means for investigating the vibrational dynamics of a variety of materials and condensed matter systems. Novel high-resolution hard x-ray optics with meV energy resolution requires a compact positioning mechanism with 20–50-nrad angular resolution and stability. Multiple innovative applications exist for the redundantly constrained weak-link structure of the preferred embodiment, such as the redundantly constrained weak-link structure 100 of FIG. 1.

Figure 5:
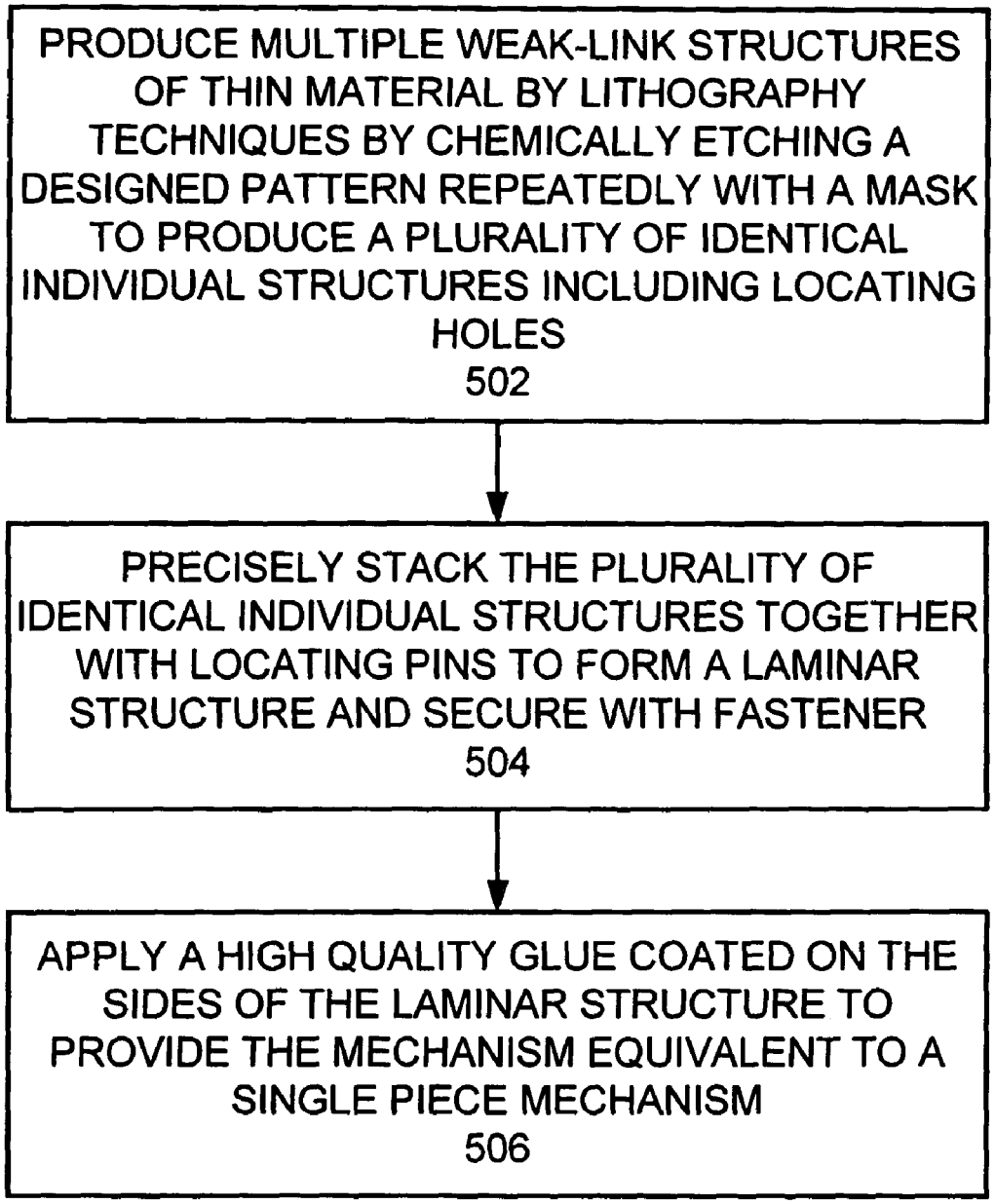
FIG. 5 is a flow chart illustrating exemplary steps for manufacturing the redundantly constrained laminar structures as weak-link mechanisms.

Referring now to FIG. 5, there are shown exemplary steps for manufacturing the redundantly constrained laminar structures as weak-link mechanisms. The method for producing the redundantly constrained laminar structures as weak-link mechanisms is carried out by lithographic techniques. A designed pattern is repeatedly chemically etched with a mask to produce a plurality of individual identical units formed of thin material and including locating holes as indicated in a block 502. The units are stacked together precisely with locating-pins to form the laminar structure and are secured together with fasteners, such as bolts, as indicated in a block 504. A high quality adhesive or glue can be applied to the sides of the laminar structure to provide the mechanism equivalent to a single piece mechanism as indicated in a block 506.

While the present invention has been described with reference to the details of the embodiments of the invention shown in the drawing, these details are not intended to limit the scope of the invention as claimed in the appended claims.

What is claimed is:

1. A method for producing the redundantly constrained laminar structures as weak-link mechanisms by lithographic techniques comprising the steps of:
repeatedly chemically etching a designed pattern with a mask to produce a plurality of individual substantially identical units;
stacking the units together to form the laminar structure;
securing the stacked units together with fasteners received in predefined locating-holes in said units; and applying an adhesive to the sides of the laminar structure to provide the mechanism equivalent to a single piece mechanism.

2. A method for producing the redundantly constrained laminar structures as weak-link mechanisms as recited in claim 1 wherein each of said plurality of individual substantially identical units is formed of a selected sheet material.

3. A method for producing the redundantly constrained laminar structures as weak-link mechanisms as recited in claim 1 wherein each of said plurality of individual substantially identical units is formed of a metal material.

4. A method for producing the redundantly constrained laminar structures as weak-link mechanisms as recited in claim 1 wherein the step of repeatedly chemically etching a designed pattern with a mask to produce a plurality of individual substantially identical units includes the step of repeatedly chemically etching a designed pattern having multiple weak-link connections with a mask to produce a plurality of individual substantially identical units.

5. A method for producing the redundantly constrained laminar structures as weak-link mechanisms as recited in claim 1 wherein the step of repeatedly chemically etching a designed pattern with a mask to produce a plurality of individual substantially identical units includes the step of repeatedly chemically etching a designed pattern with a mask to produce a set number of individual substantially identical units.

6. A method for producing the redundantly constrained laminar structures as weak-link mechanisms as recited in claim 5 wherein said set number of individual substantially identical units is selected for providing a predefined stiffness for the laminar structure.

* * * * *